(12) United States Patent
Beadle et al.

(10) Patent No.: US 7,075,979 B2
(45) Date of Patent: Jul. 11, 2006

(54) MODEM RELAY OVER A PACKET NETWORK

(75) Inventors: Michael S. Beadle, Tustin, CA (US); Paul Wren, Valbonne (FR); Frank Chen, Trebuco Canyon, CA (US); Skantha Kandiah, Irvine, CA (US); Keith Chu, Laguna Niguel, CA (US)

(73) Assignee: Mindspeed Technologies, Inc., Newport Beach, CA (US)

( * ) Notice: Subject to any disclaimer, the term of this patent is extended or adjusted under 35 U.S.C. 154(b) by 844 days.

(21) Appl. No.: 10/104,304

(22) Filed: Mar. 22, 2002

(65) Prior Publication Data

US 2002/0164002 A1 Nov. 7, 2002

Related U.S. Application Data

(60) Provisional application No. 60/288,151, filed on May 1, 2001, provisional application No. 60/288,775, filed on May 4, 2001.

(51) Int. Cl.
*H04B 1/38* (2006.01)

(52) U.S. Cl. ............... 375/222; 370/401; 370/351; 370/352

(58) Field of Classification Search ............ 375/222, 375/219, 220; 370/258, 401, 351, 352; 372/278, 372/252; 709/230, 237; 710/105
See application file for complete search history.

(56) References Cited

U.S. PATENT DOCUMENTS

| | | | |
|---|---|---|---|
| 4,996,685 A * | 2/1991 | Farese et al. ............... 370/352 |
| 6,577,715 B1 * | 6/2003 | Atsuta ................... 379/100.17 |
| 6,611,804 B1 * | 8/2003 | Dorbecker et al. ......... 704/271 |
| 6,724,416 B1 * | 4/2004 | Liu ......................... 348/14.02 |
| 6,765,931 B1 * | 7/2004 | Rabenko et al. ............ 370/493 |
| 2001/0046259 A1 | 11/2001 | Abrishami |
| 2002/0064137 A1 * | 5/2002 | Garakani et al. ........... 370/278 |
| 2002/0085501 A1 * | 7/2002 | Guven et al. ............... 370/252 |
| 2002/0176401 A1 | 11/2002 | Ryan et al. |
| 2002/0186709 A1 | 12/2002 | Takagi et al. |
| 2003/0095544 A1 | 5/2003 | Chu |
| 2003/0123097 A1 * | 7/2003 | Fruth ........................ 358/400 |

OTHER PUBLICATIONS

Schulzrinne et al RFC 2833—RTP Payload for DTMF Digits, Telephony Tones and Telephony Signals, May 2000.*

(Continued)

*Primary Examiner*—Dac Ha
*Assistant Examiner*—Jaison Joseph
(74) *Attorney, Agent, or Firm*—Farjami & Farjami LLP

(57) ABSTRACT

Various methods and systems for establishing modem relay connections are provided. For example, a modem relay method for use by a first gateway device in communication with a calling modem comprises the exemplary steps of: receiving a call from the calling modem for establishing a communication with a remote modem; requesting a second gateway device to place a call to the remote modem for establishing the communication; transmitting ANSam to the calling modem for a predetermined period of time according to an ANSam message received from the second gateway device in an RFC2833 message via a packet network; monitoring for detection of a CM signal from the calling modem; monitoring for detection of an AA signal from the calling modem; monitoring for receipt of a modulation type message from the second gateway device; and monitoring for receipt of a pass through mode message from the second gateway device.

45 Claims, 4 Drawing Sheets

OTHER PUBLICATIONS

FR 2 771 577 A (France Telecom) May 28, 1999 abstract p. 1, line 1- p. 3, line 7 p. 4, lne 28- last line p. 5, line 15- line 24 p. 8, line 10- p. 9, line 11 p. 10, line 24- line 32 p. 11, line 32- p. 12, line 32 p. 14, line 27- p. 15, line 5 p. 17, line 3- p. 18, line 14 claims 1,2 figure 1.

WO 97 49228 A (Paradyne Corp.) Dec. 24, 1997 abstract p. 5, line 1- last line p. 6, line 1- last line p. 11, line 19- p. 12, line 2 claims 1, 2, 6.
FR 2 771 577 A (France Telecom) May 28, 1999.
WO 97 49228 A (Paradyne Corp.) Dec. 24, 1997.

* cited by examiner

MODEM RELAY OVER A PACKET NETWORK

RELATED APPLICATIONS

The present application claims the benefit of U.S. provisional application Ser. No. 60/288,151, filed May 1, 2001, and U.S. provisional application Ser. No. 60/288,775 filed May 4, 2001, which are hereby fully incorporated by reference in the present application.

BACKGROUND OF THE INVENTION

1. Field of the Invention

The present invention relates generally to communications over packet networks. More particularly, the present invention relates to establishing modem communication over a packet network, such as the Internet, utilizing the Internet Protocol ("IP").

2. Related Art

In recent years, packet-based networks, such as the Internet, have begun to replace the traditional analog telephone networks for transportation of voice and data. For example, with the emergence of voice over IP ("VoIP"), telephone conversations may now be captured, packetized and transported over the Internet. In a conventional VoIP system, telephone conversations or analog voice may be transported over the local loop or the public switched telephone network ("PSTN") to the central office ("CO"). From the CO, the analog voice is transported to a gateway device at the edge of the packet-based network. The gateway device converts the analog voice or speech to packetized data using a codec (coder/decoder), according to one of various existing protocols, such as G.729, G.711, G.723.1, etc. Next, the packetized data is transmitted over the Internet using the Internet Protocol for reception by a remote gateway device and conversion back to analog voice.

Today, many have diverted their focus to using the existing packet-based network and gateway devices, which have been designed to support the transportation of analog voice or speech over IP, to further support modem communication over IP, or as it is referred to in the industry, Modem over Internet Protocol ("MoIP"). FIG. 1 illustrates a block diagram of a conventional communication model for MoIP based on a packet-based network, such as the Internet. As shown, communication model 100 includes first client communication device 110 in communication with first gateway communication device 120 over PSTN providing transmit and receive channels 112 and 114. Communication model 100 further includes second client communication device 150 in communication with second gateway communication device 140 over PSTN providing transmit and receive channels 144 and 142. Communication model 100 enables communications between first gateway communication device 120 and second gateway communication device 140 via packet network 130 utilizing the Internet Protocol. The Internet Protocol implements the network layer (layer 3) of a network protocol, which contains a network address and is used to route a message to a different network or subnetwork. The Internet Protocol further accepts packets from the layer 4 transport protocol, such as Transmission Control Protocol ("TCP") or User Data Protocol ("UDP"), and adds its own header and delivers the data to the layer 2 data link protocol. TCP provides transport functions, which ensures that the total amount of bytes sent is received correctly at the other end. UDP, which is part of the TCP/IP suite, is an alternate transport that does not guarantee delivery and it is widely used for real-time voice and video transmissions where erroneous packets are not retransmitted.

For purposes of MoIP, communication devices 110, 120, 140 and 150 are capable of performing modem functions. The term modem stands for modulator-demodulator (i.e. digital-to-analog/analog-to-digital converter). Modem is a device that is capable of adapting a terminal or computer to an analog telephone line by converting digital pulses to audio frequencies and vice versa. Modems may support a variety of data modulation standards, such as ITU (International Telecommunications Union) standards: V.92, V.90, V.34, V.32bis, V.32, V.22bis, V.22, V.21 or Bell 103, specifications of which are hereby incorporated by reference. Communication devices 110, 120, 140 and 150 may also be cable modems, DSL modems or ISDN terminal adapters, which are all digital and technically not modems, but referred to as modems in the industry. Typically, modems have built-in error correction, such as MNP2-4 and/or LAPM and data compression, such as MNP5, V.42bis or V.44. Modems are also capable of supporting various voice and facsimile standards.

Conventionally, the communication process for MoIP begins when first client modem (("M1") or first client communication device 110) calls first gateway modem (("G1") or first gateway communication device 120). As a result, G1 calls second gateway modem (("G2") or second gateway communication device 140), and G2 in turn calls second client modem (("M2") or second client communication device 150). In order to support VoIP in their default mode of operation, typically, G1 and G2 communicate in voice mode and are configured to use a compressed voice protocol, such as the ITU standard G.723.1. However, when M2 answers the incoming call from G2, M2 generates an answer tone, e.g. 2100 Hz, that causes G1 and G2 to switch to an uncompressed voice protocol, such as an ITU standard G.711, which provides toll quality audio at 64 Kbps using either A-Law or mu-Law pulse code modulation methods. This uncompressed digital format is used in order to allow easy connections to legacy telephone networks. By switching to G.711, the tones generated by M2 may propagate through G1 and G2 with less distortion in order to reach M1 at the other side. One existing method provides for maintaining G1 and G2 in G.711, such that M1 and M2 are able to handshake over packet network 130 and transfer data using G.711 packets using the Internet Protocol. However, such solution suffers from many problems, such as packet loss, jitter and delay, which cannot be tolerated by high-speed modems.

In a preferred alternative approach, known as modem relay, modem connections may be terminated locally, such that M1 and G1 handshake and make a connection locally and, similarly, M2 and G2 handshake and make a connection locally. However, due to the existence of various data modem and facsimile modem protocols, there is an intense need in the art for a universal solution to be used by gateway devices G1 and G2, such that they can distinguish between various modem protocols and communicate information relating thereto between G1 and G2 during the modem relay establishment process.

SUMMARY OF THE INVENTION

In accordance with the purpose of the present invention as broadly described herein, there is provided system and method for a universal solution for use by gateway devices for establishing a modem relay connection.

In one aspect of the present invention, a modem relay method is provided for use by a first gateway device, the modem relay method comprising: receiving a call from a local modem for establishing a communication with a remote modem; requesting a second gateway device to place a call to the remote modem for establishing the communication; receiving an answer tone message from the second gateway device indicative of an answer tone being detected by the second gateway device and a type of the answer tone; configuring the first gateway device to a modem mode based on the type of the answer tone; and generating the answer tone of the type to the local modem.

In other aspects, the type of the answer tone is indicative of an ANSam, and the configuring configures the first gateway device to, for example, V.34, V.90 or V.92 mode, or the type of the answer tone is indicative of an ANS with phase reversal, and the configuring configures the first gateway device to, for example, V.32bis or V.22bis mode. Also, in one aspect, the answer tone message is received by the first gateway device, for example, as a part of an RFC2833 message via a packet network.

In another aspect of the present invention, a modem relay method is provided for use by a first gateway device, the modem relay method comprising: receiving a call from a local modem for establishing a communication with a remote modem; requesting a second gateway device to place a call to the remote modem for establishing the communication; transmitting ANSam to the local modem for a predetermined period of time; monitoring for detection of a CM signal from the local modem; monitoring for detection of an AA signal from the local modem; monitoring for receipt of a modulation type message from the second gateway device; and monitoring for receipt of a pass through mode message from the second gateway device.

In yet another aspect, a first gateway device is capable of use for establishing a modem relay, the first gateway device comprising: a controller capable of receiving a call from a local modem for establishing a communication with a remote modem and capable of requesting a second gateway device to place a call to the remote modem for establishing the communication; a transmitter capable of transmitting ANSam to the local modem for a predetermined period of time; wherein the controller continuously monitors for (a) detection of a CM signal from the local modem, (b) detection of an AA signal from the local modem, (c) receipt of a modulation type message from the second gateway device, and (d) receipt of a pass through mode message from the second gateway device.

In one aspect, a modem relay method is provided for use by a second gateway device, the modem relay method comprising: receiving a request from a first gateway device for establishing a communication between a local modem and a remote modem; placing a call to the remote modem for establishing the communication; receiving an answer tone from the remote modem; determining a type of the answer tone; and transmitting an answer tone message to the first gateway device indicative of the answer tone being detected by the second gateway device and the type of the answer tone.

In another exemplary aspect, a modem relay method is provided for use by a second gateway device, the modem relay method comprising: receiving a request from a first gateway device for establishing a communication between a local modem and a remote modem; placing a call to the remote modem for establishing the communication; detecting an ANSam signal from the remote modem for a predetermined period of time; transmitting an ANSam message to the first gateway device in response to the detecting; monitoring for receipt of a CM message from the first gateway device; monitoring for receipt of an AA message from the first gateway device; monitoring for detection of a modulation type signal from the remote modem; and monitoring for receipt of a pass through mode message from the first gateway device.

In yet another exemplary aspect of the present invention, a modem relay method is provided for use by a second gateway device, the modem relay method comprising: receiving a request from a first gateway device for establishing a communication between a local modem and a remote modem; placing a call to the remote modem for establishing the communication; detecting an ANSam signal from the remote modem for a predetermined period of time; transmitting an ANSam message to the first gateway device in response to the detecting; monitoring for receipt of a CM message from the first gateway device during a predetermined period of time; modifying a CM signal to generate an erroneous CM signal; and transmitting the erroneous CM signal to the remote modem during the predetermined period of time.

These and other aspects of the present invention will become apparent with further reference to the drawings and specification, which follow. It is intended that all such additional systems, methods, features and advantages be included within this description, be within the scope of the present invention, and be protected by the accompanying claims.

BRIEF DESCRIPTION OF DRAWINGS

The features and advantages of the present invention will become more readily apparent to those ordinarily skilled in the art after reviewing the following detailed description and accompanying drawings, wherein.

DESCRIPTION OF EXEMPLARY EMBODIMENTS

The present invention may be described herein in terms of functional block components and various processing steps. It should be appreciated that such functional blocks may be realized by any number of hardware components and/or software components configured to perform the specified functions. For example, the present invention may employ various integrated circuit components, e.g., memory elements, digital signal processing elements, transmitters, receivers, tone detectors, tone generators, logic elements, and the like, which may carry out a variety of functions under the control of one or more microprocessors or other control devices. Further, it should be noted that the present invention may employ any number of conventional techniques for data transmission, signaling, signal processing and conditioning, tone generation and detection and the like. Such general techniques that may be known to those skilled in the art are not described in detail herein.

It should be appreciated that the particular implementations shown and described herein are merely exemplary and are not intended to limit the scope of the present invention in any way. For example, although the present invention is described using a modem over IP network, it should be noted that the present invention may be implemented in other packet based communication networks and is not limited to modem over IP. Indeed, for the sake of brevity, conventional data transmission, tone generation and detection, encoding, decoding, signaling and signal processing and other functional aspects of the data communication system (and components of the individual operating components of the system) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical communication system.

Figure 1:
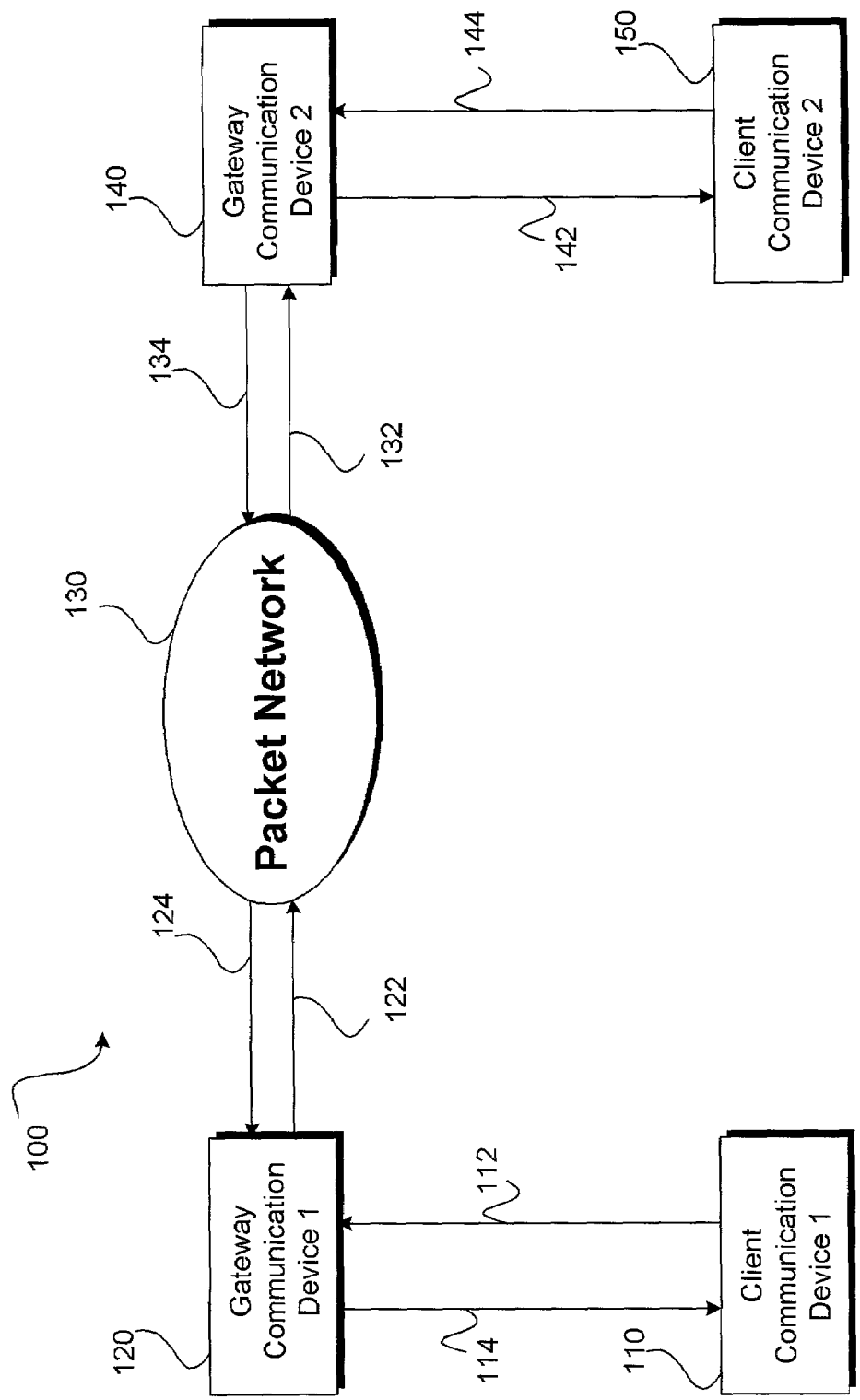
FIG. 1 illustrates a block diagram of a prior art communication model based on a packet network, such as the Internet, utilizing the Internet Protocol.
Figure 2:
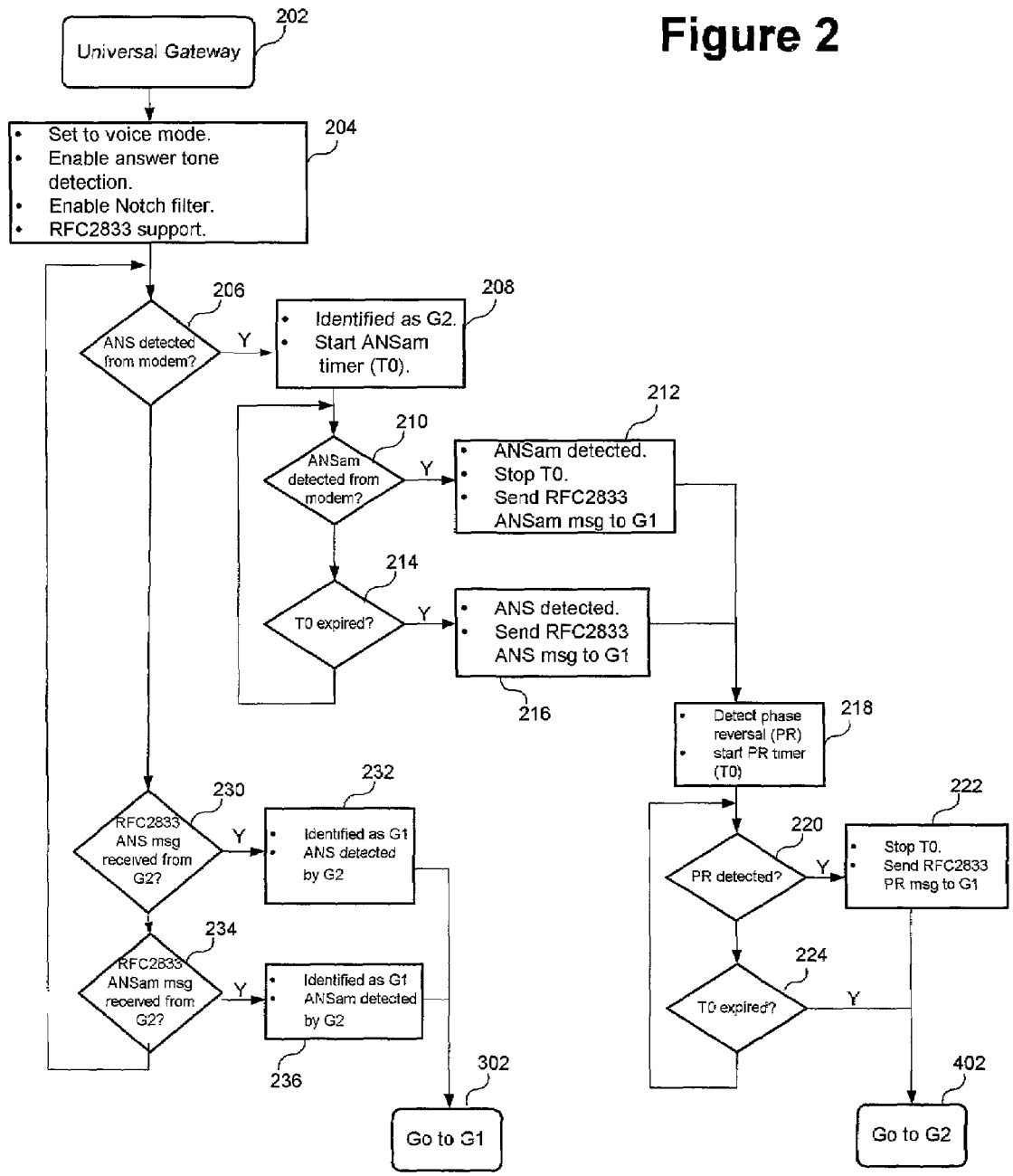
FIG. 2 illustrates a flow diagram of a communication method, according to one embodiment of the present invention, for use in a gateway device for establishing a modem relay connection.

FIG. 2 illustrates a flow diagram of universal gateway method 202, according to one embodiment of the present invention, for use in a gateway device, such as G1 120 or G2 140, for establishing a modem relay connection. Universal gateway method 202 may be executed at both G1 120 and G2 140 while configured in voice mode, for example, according to G.723.1. At step 204, G1 120 and G2 140 detectors are enabled to detect either a modem answer tone, typically at 2100 Hz, or a modem answer tone indication or message from the other gateway device. In some embodiments, detection of other possible events, such as facsimile calling tone may also be enabled at step 204. In one embodiment, G1 120 and G2 140 may communicate messages or indications, such as the answer tone message, over packet network 130 using the Internet Engineering Task Force's ("IETF") Request For Comment 2833 ("RFC2833").

Also at step 204, a notch filter centered around 2100 Hz may be enabled to block the modem answer tone, generated by answering modem 150, from being transmitted over packet network 130 to calling modem 110, so that calling modem 110 does not start a handshaking process with answering modem 150. A co-pending application Ser. No. 09/965,745, filed on Sep. 28, 2001, which is incorporated hereby by reference, describes various methods and systems for preventing the modem answer tone, generated by answering modem 150, from reaching calling modem 110.

As shown, in step 206, the gateway device determines whether a modem answer tone is being detected. If a modem answer tone is detected, universal gateway method 202 moves to step 208, where the gateway device identifies itself as the gateway device in communication with answering modem 150, i.e. the gateway device is G2 140. Further, in step 208, G2 140 starts a timer for determining whether the answer tone being detected is an amplitude modulated answer tone (ANSam). ANSam is known to be a sinewave at 2100 Hz signal, which is amplitude modulated at 15 Hz. As shown, at step 210, it is determined whether ANSam is detected. If G2 140 detects ANSam at step 210, universal gateway method 202 moves to step 212 and an ANSam message is transmitted to G1 to inform G1 that ANSam has been detected, else universal gateway method 202 moves to step 214, where it is determined whether the ANSam timer has expired. If, at step 214, it is determined that the ANSam timer has not expired, universal gateway method 202 moves back to step 210 and continues looking for ANSam, else, once the ANSam timer expires, universal gateway method 202 moves to step 216, where it is determined that the answer tone is not amplitude modulated and an ANS message is transmitted to G1 to inform G1 that a non-ANSam answer tone has been detected. As stated above, such messages may be transmitted using various packets or signals over packet network 130. In a preferred embodiment, however, RFC2833 messages are utilized for transporting the above-described messages.

Next, at step 218, G2 140 is configured to determine, for a predetermined period of time designated by a phase reversal timer, whether the answer tone includes phase reversals (PR) at 450 ms intervals. At step 220, G2 140 determines whether phase reversals are detected and, if so, universal gateway method 202 moves to step 222, where G2 140 transmits a PR message to G1 to inform G1 that a PR has been detected and universal gateway method 202 moves to step 402 to proceed according to G2 process. In one embodiment, a single message indicative of ANS and PR may be transmitted, rather than transmitting two messages. On the other hand, if PR is not detected in step 220, universal gateway method 202 moves to step 224, where it is determined if the phase reversal timer has expired. If the phase reversal timer has not expired, universal gateway method 202 moves back to step 220 and continues looking for PR, else universal gateway method 202 moves to step 402 to proceed according to G2 process.

It should be noted that the detection of ANSam by G2 140 is indicative that one of modem modulations of V.34, V.90 or V.92 will follow. Further, according to the aforementioned standards, ANSam includes a phase reversal, accordingly, in some embodiments, universal gateway method 202 may move directly from step 212 to step 402. It should also be noted that V.32 and V.32bis modem modulations require that the answer tone to include phase reversals, and therefore, the detection of phase reversals would distinguish between V.32bis/V.32 modem modulations on one hand and lower modem modulations, such as V.22bis, V.22 and so on, on the other hand, which use a pure answer tone.

Returning to step 206, if the gateway device does not see a modem answer tone, universal gateway method 202 moves to step 230, where the gateway device determines whether an ANS message is received from the remote gateway device, if so, universal gateway method 202 moves to step 232 and the gateway device identifies itself as the gateway device in communication with calling modem 110, i.e. the gateway device is G1 120. Further, at step 232, G1 120 notes that the modem answer tone is not amplitude modulated and universal gateway method 202 moves to step 302 to proceed according to G1 process. Now, if the gateway device does not receive an ANS message at step 230, universal gateway method 202 moves to step 234, where the gateway device determines whether an ANSam message is received from the remote gateway device, if so, universal gateway method 202 moves to step 236 and the gateway device identifies itself as the gateway device in communication with calling modem 110, i.e. the gateway device is G1 120. In addition, at step 236, G1 120 notes that the modem answer tone is amplitude modulated and universal gateway method 202 moves to step 302 to proceed according to G1 process.

Figure 3:
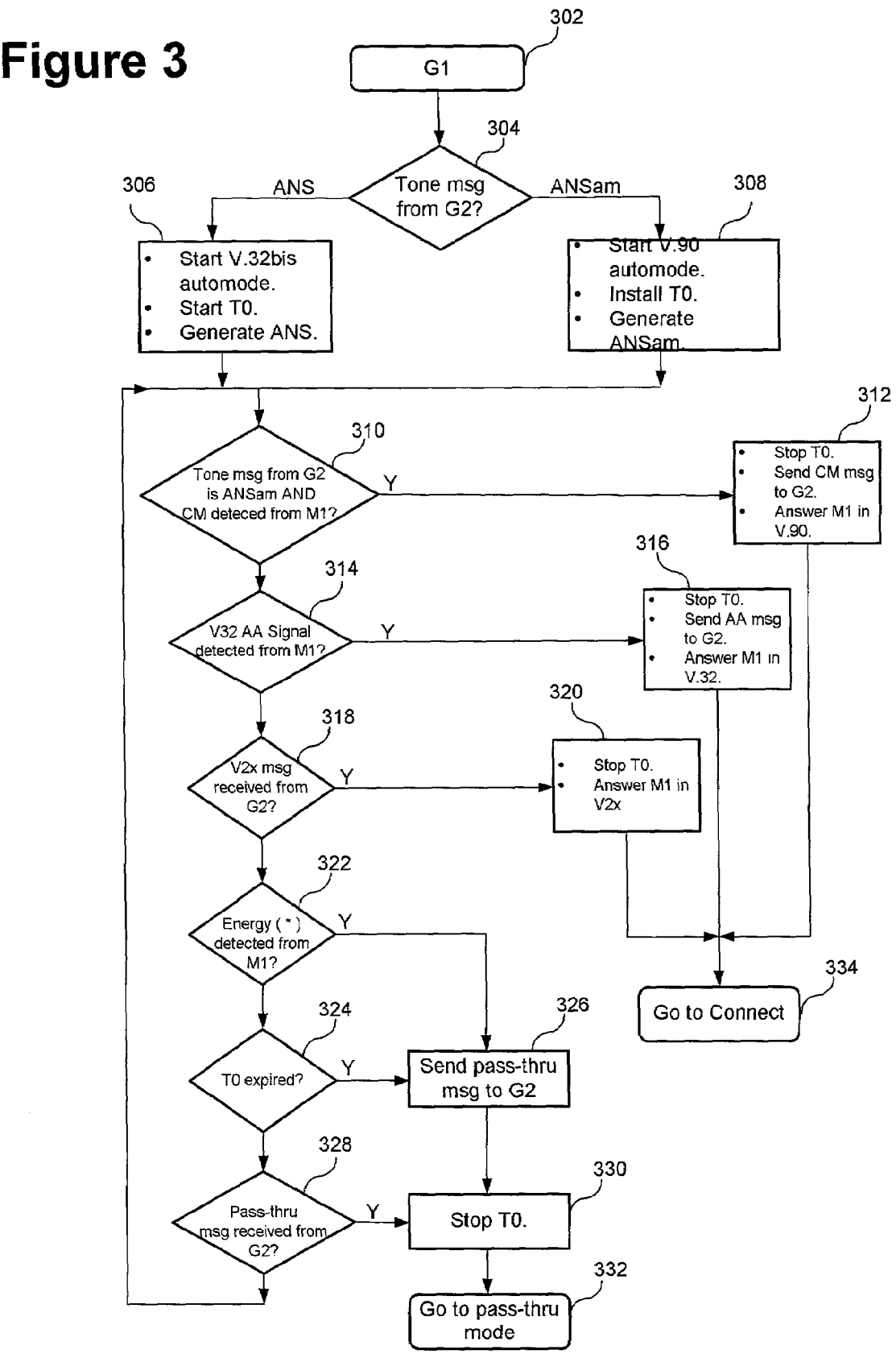
FIG. 3 illustrates a flow diagram of a communication method for use in a gateway device of FIG. 2, wherein the gateway device is in communication with a calling modem.

Turning to FIG. 3, it illustrates a flow diagram of G1 process 302 for use in G1 120. As shown, G1 process 302 immediately proceeds to step 304 to retrieve the type of modem answer tone generated by answering modem 150 and received by G1 120 from G2 140 as either an ANS message or an ANSam message. In one embodiment, G1 120 generates the same type of answer tone as the one generated by the calling modem 150. For example, if an ANS message is received from G2 140, G1 120 generates an answer tone with phase reversal, according to the V.32bis/V.32 standard. On the other hand, if an ANSam message is received from G2 140, G1 120 generates an amplitude modulated answer tone, according to the V.34, V.90 or V.92 standard. Although not shown in FIG. 3, in one embodiment, G1 process 302 may further await a PR message and include a phase reversal in the answer tone only if the PR message is received. Further, in other embodiments, G1 process 302 may ignore the type of answer tone received from G2 140 and generate one of pure answer tone, answer tone with phase reversal or ANSam depending upon G1 120 predetermined setting.

Now, if G1 process 302 moves to step 306, G1 120 is configured to initiate an automode process in V.32bis mode by starting an automode timer and generating a modem answer tone with phase reversal to indicate V.32bis capability. The automode processes are well known in the art and generally describe a method according to which a modem is configured to a modulation providing the highest possible speed for the modem, and wherein the modem automatically connects at or falls back to the highest compatible modulation and speed supported by the remote modem. Therefore, a modem configured in V.32bis automode may connect to a remote modem at a data rate supported by one of V.32bis, V.32, V.22bis, V.22, V.21 or Bell 103 modulation techniques. It should be noted that in some embodiments, depending on G1 120 setting, the automode process may start from V.32 or V.22bis.

On the other hand, if G1 process 302 moves to step 308, G1 120 is configured to initiate an automode process in V.90 mode by starting an automode timer and generating an ANSam answer tone to indicate V.90 capability. In some embodiments, the automode process may start in V.92 mode, where G1 120 may fallback to V.90, V.34, V.32bis, V.32, V.22bis, V.22, V.21 or Bell 103 depending upon the modulation supported by calling modem 110. Yet, in one embodiment, the automode process may start in V.34 mode, where G1 120 may fallback to V.32bis, V.32, V.22bis, V.22, V.21 or Bell 103. One of ordinary skill in the art appreciates that the automode process may start at a variety of starting modulations and fallback therefrom to lower speed modulations.

Subsequent to steps 306 and 308, G1 120 continuously awaits one of possible events in steps 310, 314, 318, 322, 324 and 328. At step 310, G1 120 determines whether a Call Menu (CM) signal is received from calling modem 110. It should be noted that step 310 is only applicable if G1 120 identifies itself as V.34, V.90 or V.92 capable device by generating an ANSam, at step 308. The CM signal is a part of V.8 protocol that is implemented by V.34, V.90 or V.92 devices. V.8 is a procedure for starting a data transmission session according to V.34, V.90 or V.92 standards. As a part of V.8, calling modem 110 transmits the CM signal, which initiates the process of modulation-mode selection and includes ten (10) ONEs followed by ten (10) synchronization bits at 300 bits/sec, one octet defining the required call function, e.g. V.18 text telephone, and one or more octets indicating available modulation modes, such as V.92, V.90, V.34, V.34 half duplex, V.32 bis/V32, V.22 bis/V22, V.17, V.29, V.27ter, V.26ter, V.26bis, V.23, V.23 half duplex and V.21. The CM signal may also include an octet indicating cellular access.

If, at step 310, G1 120 receives the CM signal from calling modem 110, G1 process 302 moves to step 312, where G1 120 terminates the automode timer to indicate the end of automoding and transmits a CM indication or message to G2 140 to inform G2 of the required call function and the available modulation modes of calling modem 110. Further, at step 312, G1 120 proceeds with negotiations according to the contents of the CM signal and G1 process 302 moves to step 334, where G1 120 and calling modem 110 connect or create a data session. For example, if the CM signal from calling modem 110 indicates V.92 capability, G1 120 may answer according to the V.92 standard, but if the CM signal from calling modem 110 indicates V.90 capability and not V.92 capability, G1 120 may answer according to the V.90 standard, and so on. In one embodiment, G1 120 may respond to the CM signal according to a predetermined setting. For example, if the CM signal indicates that calling modem 110 is capable of supporting V.92, V.90 and V.34, G1 120 may answer according to the V.34 standard if that is its preferred mode of operation according to its predetermined setting. Further, according to V.8, G1 120 informs calling modem 110 of its desired modulation by transmitting a Joint Menu (JM) signal, which includes ten (10) ONE$_s$ followed by ten (10) synchronization bits, the same call function as in the received CM and all octets necessary to indicate all common modulation modes. According to V.8, the modulation mode with the lowest item number will be shall be used in the subsequent data sessions.

It should be noted that, in one embodiment, step 312 includes an exception for V.18 text telephone, where G1 120, rather than negotiating with calling modem 110 according to the V.90 standard, switches to modem pass through mode to facilitate the V.18 text telephone mode. V.18 is a well-known standard that defines the operational and interworking requirements for modems operating in the text telephone mode interfaces and voice-band modems. Further, once G2 140 receives the CM message, which indicates V.18 text telephone, it also switches to modem pass through mode to facilitate a V.18 connection between communication devices 110 and 150. In a preferred embodiment, the modem pass through mode is implemented by configuring G1 120 and G2 140 according to G.711 with echo cancelers and echo suppressors disabled and jitter buffer frozen, where communication devices 110 and 150 can perform an end-to-end communication.

If, at step 310, G1 120 does not detect the CM signal, G1 process 302 moves to step 314 to determine if an AA signal indicative of V.32bis/V.32 modulation is being received from calling modem 110. If so, G1 process 302 moves to step 316, where G1 120l terminates the automode timer to indicate the end of automoding and transmits an AA message to G2 140 to inform G2 that calling modem 110 is a V.32bis/V.32 capable modem. Preferably, at step 312, G1 120 proceeds with negotiations according to the V.32bis/V.32 standard and G1 process 302 proceeds to step 334, where G1 120 and calling modem 110 connect or create a data session. It should be noted that after the data session is established at step 334, G1 120 may communicate various characteristics and features of the data session to G2 140, such as modulation type, connection speed, error-correction type, compression type and details relating to each category.

If G1 120 does not detect an AA signal at step 314, G1 process 302 moves to step 318, where G1 120 determines whether a V.22bis/V.22, V.21 or V.23 message is received from G2 140. If so, G1 process 302 moves to step 320, where G1 120 terminates the automode timer to indicate the end of automoding and proceeds with negotiations according to the V.2x standard, and G1 process 302 proceeds to step 334, where G1 120 and calling modem 110 connect or create a data session. It should be noted that in some embodiments, G1 120 may ignore the V.2x message and negotiate with calling modem 110 according to the automode process to achieve a connection at the highest possible speed. In other words, some embodiments may not include step 318.

If G1 120 does not receive a V.2x message at step 318, G1 process 302 moves to step 322, where G1 determines whether an unknown energy, such as human voice or an unknown modem protocol, is being detected for a predetermined period of time, e.g. 100 ms. If so, G1 process 302 moves to step 326, where G1 120 transmits a modem pass through message to G2 140. Next at step 330, G1 process 302 terminates the automode timer to indicate the end of automode process and moves to step 332, where as described above, both G1 120 and G2 140 are configured to, for example, G.711 pass through mode with echo cancelers and echo suppressors disabled and jitter buffer frozen, to facilitate direct communication between first client communication device 110 and second client communication device 150.

Furthermore, if the automode timer expires, G1 process 302 detects such expiration at step 324, which causes G1 process 302 to move to steps 326, 330 and 332, as described above and, hence, to modem pass through mode. Similarly, if at step 328, G1 120 receives a pass through mode message from G2 140, G1 process 302 moves to steps 326, 330 and 332, as described above and, hence, to modem pass through mode. Accordingly, steps 310, 314, 318, 322, 324 and 328 are executed continuously until an event corresponding to one of these steps occurs. Preferably, steps 310, 314, 318, 322, 324 and 328 are executed in parallel with each other, although described in a serial fashion, and G1 process 302 is in effect in a wait state for any of the above-described inputs to trigger one of the steps 310, 314, 318, 322, 324 and 328.

Figure 4:
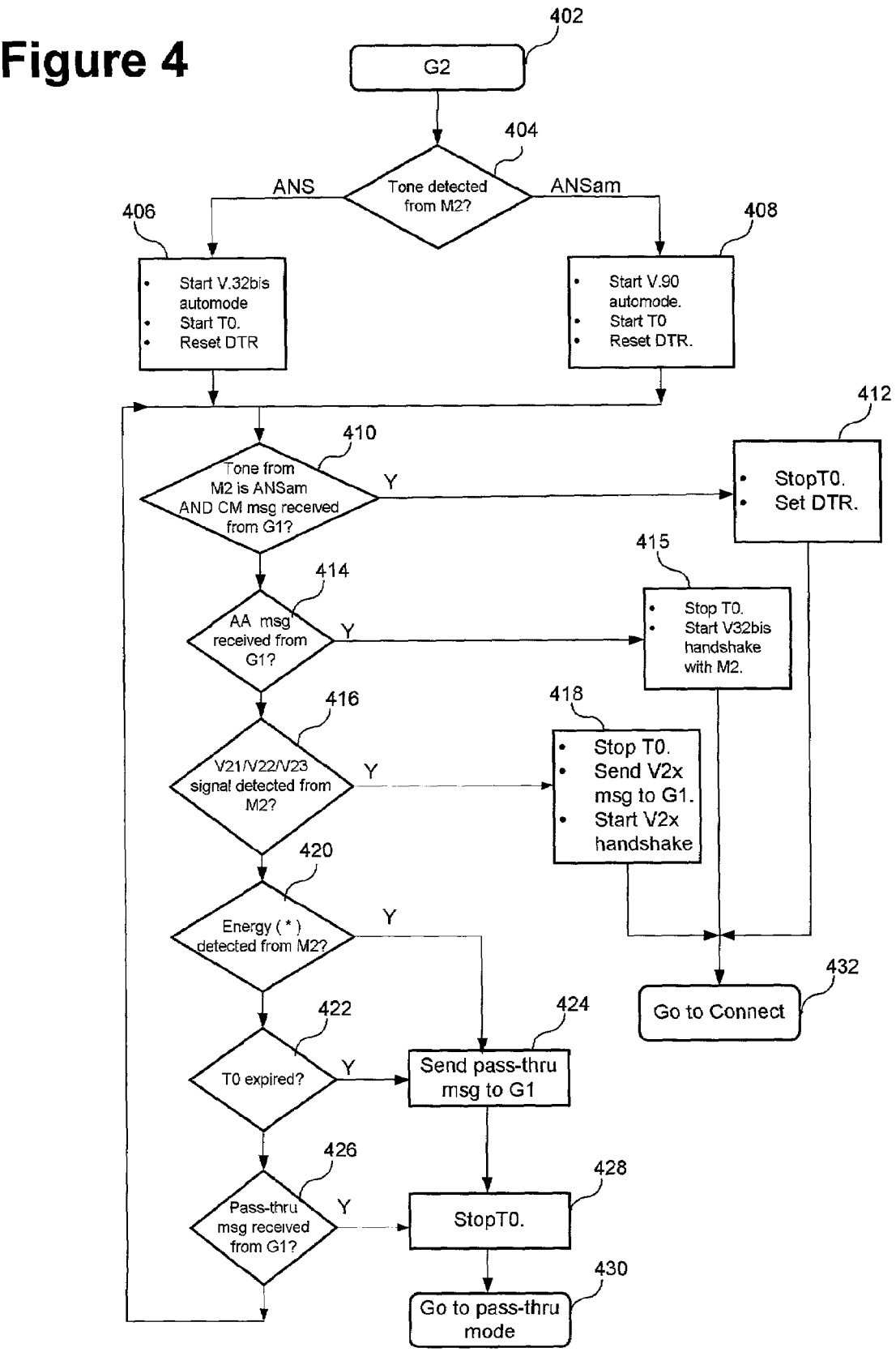
FIG. 4 illustrates a flow diagram of a communication method for use in a gateway device of FIG. 2, wherein the gateway device is in communication with an answering modem.

Turning to FIG. 4, it illustrates a flow diagram of G2 process 402 for use in G2 140. As shown, G2 process 402 immediately proceeds to step 404 to retrieve the type of modem answer tone being generated by answering modem 150. If the answer tone being detected is not amplitude modulated, i.e. non-ANSam, G2 process 402 moves to step 406 and G2 140 is configured to V.32bis mode and starts an automode process by starting an event timer and resetting the data terminal ready (DTR) control to prevent G2 140 from training while waiting for occurrence of one of the events in steps 410, 414, 416, 420, 422 or 426. Accordingly, G2 140, which is configured in V.32bis automode, may connect with answering modem 150 modem at a data rate supported by one of V.32bis, V.32, V.22bis, V.22, V.21 or Bell 103 modulation techniques. It should be noted that in some embodiments, if a pure answer tone is detected, G2 140 may be configured to V.22bis automode rather than V.32bis automode.

On the other hand, if an ANSam is detected in step 404, G2 process 402 moves to step 408, where G2 140 is configured to V.90 mode and starts an automode process by starting an event timer and resetting the DTR control to prevent G2 140 from training while waiting for occurrence of one of the events in steps 410, 414, 416, 420, 422 or 426. In some embodiments, the automode process may start at V.92, where G2 140 may fallback to V.90, V.34, V.32bis, V.32, V.22bis, V.22, V.21 or Bell 103 depending upon the modulation supported by answering modem 150. Yet, in another embodiment, the automode process may start at V.34, where G2 140 may fallback to V.32bis, V.32, V.22bis, V.22, V.21 or Bell 103. One of ordinary skill in the art appreciates that the automode process may start at a variety of starting modulations and fallback therefrom to lower speed modulations.

Next, G2 140 continuously awaits one of possible events in steps 410, 414, 416, 420, 422 and 426. For example, at step 410, which is entered from steps 406 and 408, G2 140 determines whether a CM message has been received from G1 120. In the embodiment of FIG. 4, in step 410, the CM message may be received only if answering modem 150 generates an ANSam, based on the assumption that G1 120 will generate the same type of answer tone as the one communicated to G1 120 via an ANSam message. However, in some embodiments, as discussed above, G1 120 may ignore the answer tone message from G2 140 and generate any type of answer depending upon its predetermined setting. For example, even if G1 120 receives an ANS message from G2 140, G1 120 may generate an ANSam and, thus, receive a CM signal from calling modem 110. In such event, at step 410, G2 140 may receive a CM message even though G2 140 detects a pure answer tone from answering modem 150. It should be noted that, although some embodiments of the present invention enable G1 120 and G2 140 to communicate various messages over packet network 130 to provide the ability to achieve similar or compatible connections at both ends of packet network 130, in other embodiments, the messages can be used for other purposes and G1 120 and calling modem 110 may connect at a different modulation and/or speed than G2 140 and answering modem 150.

Returning to step 410, if a CM message is received from G1 120, G2 process 402 moves to step 412, where G2 140 terminates the event timer to indicate that one of the possible events has occurred and asserts the DTR control to start automoding at the mode selected in step 408, such as V.92, V.90 or V.34, or modified at step 410 according to the CM message, and G2 process 402 moves to step 432, where G2 140 and answering modem 150 connect or create a data session. However, as an exception, if at step 410, the CM message indicates a V.18 call function, rather than moving from step 410 to step 412, G2 process 402 moves to a step similar to step 424, where G2 140 is configured to modem pass through mode to facilitate V.18 text telephone.

If, at step 410, G2 140 does not receive the CM message from G1 120, G2 process 402 moves to step 414 to determine if an AA message has been received from G1 120. If so, G2 process 402 moves to step 415, where G2 140 terminates the event timer to indicate that one of the possible events has occurred and asserts the DTR control to start automoding at the mode selected in step 406, such as V.32bis, and G2 process 402 moves to step 432, where G2 140 and answering modem 150 connect or create a data session.

If, at step 414, G2 140 does not receive the AA message from G1 120, G2 process 402 moves to step 416 to determine if V.22bis, V.22, V.21 or V.23 signals are being received from answering modem 150. For example, for the purpose of detecting V.22bis/V.22, G2 140 is configured to detect an unscrambled one's signal, and for the purpose of detecting V.21s/V.23, G2 140 is configured to detect a mark signal. If such signals are detected, G2 process 402 moves to step 418, where G2 140 terminates the event timer to indicate that one of the possible events has occurred, transmits a V.2x message to G1 120 to inform G1 120 of V.22bis, V.22, V.21 or V.23 signals and asserts the DTR control to start handshaking at one of V.22bis, V.22, V.21 or V.23 modes, and G2 process 402 moves to step 432, where G2 140 and answering modem 150 connect or create a data session. It should be noted that after the data session is established at step 432, G2 140 may communicate various characteristics and features of the data session to G1 120, such as modulation type, connection speed, errorcorrection type, compression type and details relating to each category.

If G2 140 does not detect a V.2x signal at step 416, G2 process 402 moves to step 420, where G2 140 determines whether an unknown energy, such as human voice or an unknown modem protocol, is being detected for a predetermined period of time, e.g. 100 ms. If so, G2 process 402 moves to step 424, where G2 140 transmits a modem pass through message to G1 120. Next, at step 428, G2 process 402 terminates the event timer and moves to step 430, where as described above, both G1 120 and G2 140 are configured to, for example, G.711 pass through mode with echo cancelers and echo suppressors disabled and jitter buffer frozen, to facilitate direct communication between first client communication device 110 and second client communication device 150.

According to one embodiment of the present invention, G2 process 402 may also include a step of detecting V.21 (L) flags (not shown). If G2 140 detects a predetermined number of such flags, then G2 140 terminates the event timer to indicate that one of the possible events has occurred, transmits a T.38 message to G1 120 and switches to T.38 fax mode.

Next, if the event timer expires, G2 process 402 detects such expiration at step 422, which causes G2 process 402 to move to steps 424, 428 and 430, as described above and, hence, to modem pass through mode. Similarly, if at step 426, G2 140 receives a pass through message from G1 120, G2 process 402 moves to steps 424, 428 and 430, as described above and, hence, to modem pass through mode. Accordingly, steps 410, 414, 416, 420, 422 and 426 are executed continuously until an event corresponding to one of these steps occurs. Preferably, steps 410, 414, 416, 420, 422 and 426 are executed in parallel with each other, although described in a serial fashion, and G2 process 402 is in effect in a wait state for any of the above-described inputs to trigger one of the steps 410, 414, 416, 420, 422 and 426.

As stated above, although G1 120 and G2 140 communicate various messages to one another over packet network 130, as shown in G1 process 302 and G2 process 402, for example, G2 140 may choose to ignore one or more of such messages or indications and make a connection with answering modem 150 according to G2 140 predetermined settings. For example, in one embodiment, G2 140 may choose not to use the CM message or the AA message received from G1 120 and, instead, start the automode process in V.92 configuration. Accordingly, G2 140 and answering modem 150 may negotiate a data session regardless of or different than the type of data session being negotiated between G1 120 and calling modem 110. As another example, even if the AA message is received in step 414, G2 may be configured to perform the automode process starting in V.92 mode and, thus, G2 process 402 may move to step 412.

In some embodiments of the present invention, G2 140 may desire to receive a message from G1 120, such as the messages discussed in steps 410, 414 or 426, prior to proceeding with the automode process and performing a handshake with answering modem 150; however, calling modem 150 may terminate the call progress if it does not receive a response from G2 140 within a predetermined amount of time after answering modem 150 transmits ANSam. In such event, there is a need to ensure that answering modem 150 does not time-out or terminate the call progress for the delay caused by G2 140 waiting to receive a message from G1 120. Accordingly, in one embodiment, if ANSam has been detected, which indicates V.34, V.90 or V.92 type of modulation, G2 140 transmits an improper CM signal to answering modem 150, such that the transmitted CM signal is rejected by answering modem 150 as erroneous. In such event, answering modem 150 moves to an error recovery state to receive a proper CM signal from G2 140. Accordingly, G2 140 obtains more time to receive a message from G1 120, as a result of answering modem 150 being diverted into the error recovery state. Once G2 140 receives a message from G1 120, G2 140 will transmit a proper CM signal to answering modem 150 to terminate the error recovery state, such that G2 140 and answering modem 150 can proceed with the automode and training process. The improper CM signal may, for example, be a modified CM signal that includes erroneous octets.

Furthermore, in one embodiment of the present invention, second communication device 150 may be designed to indicate to G2 140 that second communication device 150 is in fact another server. In such event, G2 140 and second communication device 150 can fall back to HDLC pass through mode and establish a fully-digital communication channel, according to various digital protocols, such as V.120. As a result, a sever-to server connection may be established and G2 140 and second communication device 150 can take advantage of a higher channel bandwidth.

In addition, in another embodiment, after G1 120 and G2 140 perform an independent handshake with their respective local modems, i.e. calling modem 110 and answering modem 150, the resulting connections may be achieved at different speeds. For example, G1 120 and calling modem 110 may connect at a speed of 28.8 kbps according to V.90 modulation, and G2 140 and answering modem 150 may connect at a speed of 21.6 kbps according to V.34 modulation. However, as a result of the speed mismatch, a data loss may occur if no flow control protocol exists between G2 140 and answering modem 150, since G2 140 will be receiving data from G1 120 at higher speed, i.e. 28.8 kbps, than G2 140 can transmit the same to answering modem 150 at the speed of 21.6 kbps. As noted above, G1 120 and G2 140 may communication various characteristics and features of their respective local data sessions, including connection speeds, protocol types, etc., once a data session is established originally or re-established thereafter through a retrain or once rate a re-negotiation occurs. As a result, G1 120 can assess the possibility of data loss based on the information received from G2 140 and can initiate a rate a shift between G1 120 and calling modem 110 to reduce the connection speed to 21.6 kbps. Alternatively, G2 140 may be able to initiate a rate a shift between G2 140 and answering modem 150 to increase the connection speed to 28.8 kbps. Accordingly, in one embodiment of the present invention, potential data loss can be prevented.

The methods and systems presented above may reside in software, hardware, or firmware on the device, which can be implemented on a microprocessor, digital signal processor, application specific IC, or field programmable gate array ("FPGA"), or any combination thereof, without departing from the spirit of the invention. Furthermore, the present invention may be embodied in other specific forms without departing from its spirit or essential characteristics. The described embodiments are to be considered in all respects only as illustrative and not restrictive.

What is claimed is:

1. A modem relay method for use by a first gateway device, said modem relay method comprising:
   receiving a call from a local modem for establishing a communication with a remote modem;
   requesting a second gateway device to place a call to said remote modem for establishing said communication;
   transmitting an amplitude modulated answer tone (ANSam) to said local modem for a predetermined period of time;
   monitoring for detection of a call menu (CM) signal from said local modem;
   monitoring for detection of an AA signal from said local modem;
   monitoring for detection of an energy from said local modem, wherein said energy is not related to said CM signal or said AA signal;
   detecting said energy;
   transmitting a modem pass through message to said second gateway device; and
   configuring said first gateway device to modem pass through mode.

2. The modem relay method of claim 1, further comprising:
   monitoring for receipt of a modulation type message from said second gateway device; and
   monitoring for receipt of a pass through mode message from said second gateway device.

3. The modem relay method of claim 1, wherein said first gateway device receives said CM message, said modem relay method further comprising:
   configuring said first gateway device to V.90 mode; and
   handshaking with said local modem.

4. The modem relay method of claim 1, wherein said first gateway device receives said CM message, said modem relay method further comprising:
   configuring said first gateway device to V.34 mode; and
   handshaking with said local modem.

5. The modem relay method of claim 1, wherein said first gateway device detects said CM signal, said modem relay method further comprising:
   determining a V.18 connection based on said CM signal; and
   configuring said first gateway device to modem pass through mode to facilitate said V.18 connection.

6. The modem relay method of claim 1, wherein said first gateway device detects said AA message, said modem relay method further comprising:
   configuring said first gateway device to V.32bis mode; and
   handshaking with said local modem.

7. The modem relay method of claim 1, wherein said first gateway device detects said AA message, said modem relay method further comprising:
   configuring said first gateway device to V.92 mode; and
   handshaking with said local modem.

8. The modem relay method of claim 2, wherein said first gateway device receives said modulation type signal, said modem relay method further comprising:
   transmitting a modulation type message to said second gateway device;
   configuring said first gateway device based on said modulation type signal; and
   handshaking with said local modem.

9. The modem relay method of claim 8, wherein said modulation type signal is marks.

10. The modem relay method of claim 2, wherein said first gateway device detects said pass through mode message, said modem relay method further comprising: configuring said first gateway device to pass through mode.

11. The modem relay method of claim 10, wherein said first gateway device is configured to G.711.

12. The modem relay method of claim 11, wherein said first gateway device includes an echo canceler and a jitter buffer, and wherein said echo canceler is disabled and said jitter buffer is frozen.

13. The modem relay method of claim 3 further comprising: configuring said first gateway device to automode.

14. The modem relay method of claim 1 further comprising:
   modifying a CM signal to generate an erroneous CM signal;
   transmitting said erroneous CM signal to said local modem during said monitoring steps.

15. A modem relay method for use by a second gateway device, said modem relay method comprising:
   receiving a request from a first gateway device for establishing a communication between a local modem and a remote modem;
   placing a call to said remote modem for establishing said communication;
   detecting an amplitude modulated answer tone (ANSam) signal from said remote modem for a predetermined period of time;
   transmitting an ANSam message to said first gateway device in response to said detecting;
   monitoring for receipt of a call menu (CM) message from said first gateway device;
   monitoring for receipt of an AA message from said first gateway device;
   monitoring for detection of an energy from said remote modem, wherein said energy is not related to said modulation type signal;
   detecting said energy:
   transmitting a modem pass through message to said first gateway device; and
   configuring said second gateway device to modem pass through mode.

16. The modem relay method of claim 15, wherein said second gateway device receives said CM message, said modem relay method further comprising:
   configuring said second gateway device to V.92 mode; and
   handshaking with said remote modem.

17. The modem relay method of claim 15, wherein said second gateway device receives said CM message, said modem relay method further comprising:
   configuring said second gateway device to V.90 mode; and
   handshaking with said remote modem.

18. The modem relay method of claim 15, wherein said second gateway device receives said CM message, said modem relay method further comprising:
   configuring said second gateway device to V.34 mode; and
   handshaking with said remote modem.

19. The modem relay method of claim 15, wherein said second gateway device detects said CM signal, said modem relay method further comprising:
   determining a V.18 connection based on said CM signal; and
   configuring said second gateway device to modem pass through mode to facilitate said V.18 connection.

20. The modem relay method of claim 15, wherein said second gateway device detects said AA message, said modem relay method further comprising:
configuring said second gateway device to V.32bis mode; and
handshaking with said remote modem.

21. The modem relay method of claim 15, wherein said second gateway device detects said AA message, said modem relay method further comprising:
configuring said second gateway device to V.92 mode; and
handshaking with said remote modem.

22. The modem relay method of claim 15 further comprising:
monitoring for detection of a modulation type signal from said remote modem; and
monitoring for receipt of a pass through mode message from said first gateway device.

23. The modem relay method of claim 16 further comprising: configuring said second gateway device to auto-mode.

24. The modem relay method of claim 22, wherein said second gateway device receives said modulation type signal, said modem relay method further comprising:
transmitting a modulation type message to said first gateway device;
configuring said second gateway device based on said modulation type signal; and
handshaking with said remote modem.

25. The modem relay method of claim 24, wherein said modulation type signal is unscrambled one's.

26. The modem relay method of claim 24, wherein said modulation type signal is marks.

27. The modem relay method of claim 22, wherein said second gateway device detects said pass through mode message, said modem relay method further comprising: configuring said second gateway device to pass through mode.

28. The modem relay method of claim 27, wherein said second gateway device is configured to G.711.

29. The modem relay method of claim 28 wherein said second gateway device includes an echo canceler and a jitter buffer, and wherein said echo canceler is disabled and said jitter buffer is frozen.

30. The modem relay method of claim 15 further comprising:
modifying a CM signal to generate an erroneous CM signal;
transmitting said erroneous CM signal to said remote modem during said monitoring steps.

31. A modem relay method for use by a second gateway device, said modem relay method comprising:
receiving a request from a first gateway device for establishing a communication between a local modem and a remote modem;
placing a call to said remote modem for establishing said communication;
detecting an amplitude modulated answer tone (ANSam) signal from said remote modem for a predetermined period of time;
transmitting an ANSam message to said first gateway device in response to said detecting;
monitoring for receipt of a call menu (CM) message from said first gateway device during a predetermined period of time;
modifying a CM signal to generate an erroneous CM signal; and
transmitting said erroneous CM signal to said remote modem during said predetermined period of time.

32. The modem relay method of claim 31 further comprising:
monitoring for receipt of an AA message from said first gateway device;
monitoring for detection of a modulation type signal from said remote modem; and
monitoring for receipt of a pass through mode message from said first gateway device.

33. The modem relay method of claim 31 further comprising:
monitoring for detection of an energy from said remote modem, wherein said energy is not related to said modulation type signal;
detecting said energy;
transmitting a modem pass through message to said first gateway device; and
configuring said second gateway device to modem pass through mode.

34. A first gateway device for establishing a modem relay, said first gateway device comprising:
a receiver configured to receive a call from a local modem for establishing a communication with a remote modem;
a controller configured to request a second gateway device to place a call to said remote modem for establishing said communication;
a transmitter configured to transmit an amplitude modulated answer tone (ANSam) to said local modem for a predetermined period of time;
wherein said controller is further configured to monitor for detection of a call menu (CM) signal from said local modem, monitor for detection of an AA signal from said local modem, and monitor for detection of an energy from said local modem, wherein said energy is not related to said CM signal or said AA signal; and
wherein said controller is further configured to detect said energy, cause said transmitter to transmit a modem pass through message to said second gateway device and configure said first gateway device to modem pass through mode.

35. The first gateway device of claim 34, wherein said controller is further configured to monitor for receipt of a modulation type message from said second gateway device, and monitor for receipt of a pass through mode message from said second gateway device.

36. The first gateway device of claim 34, wherein said receiver receives said CM message, and said controller configures said first gateway device to V.90 mode, and handshakes with said local modem.

37. The first gateway device of claim 34, wherein said controller detects said CM signal, and said controller determines a V.18 connection based on said CM signal, and configures said first gateway device to modem pass through mode to facilitate said V.18 connection.

38. The first gateway device of claim 34, wherein said controller is configured to modify a CM signal to generate an erroneous CM signal, and cause said transmitter to transmit said erroneous CM signal to said local modem while monitoring.

39. A second gateway device for establishing a modem relay, said second gateway device comprising:
a receiver configured to receiving a request from a first gateway device for establishing a communication between a local modem and a remote modem;

a controller configured to place a call to said remote modem for establishing said communication, and detect an amplitude modulated answer tone (ANSam) signal from said remote modem for a predetermined period of time;

a transmitter configured to transmit an ANSam message to said first gateway device in response to detecting said ANSam;

wherein said controller is further configured to monitor for receipt of a call menu (CM) message from said first gateway device, monitor for receipt of an AA message from said first gateway device, and monitor for detection of an energy from said remote modem, wherein said energy is not related to said modulation type signal; and wherein said controller is further configured to detect said energy, cause said transmitter to transmit a modem pass through message to said first gateway device, and configure said second gateway device to modem pass through mode.

40. The second gateway device of claim 39, wherein said receiver receives said CM message, and said controller configures said second gateway device to V.92 mode, and handshakes with said remote modem.

41. The second gateway device of claim 39, wherein said controller is configured to detect said CM signal, determines a V.18 connection based on said CM signal, and configures said second gateway device to modem pass through mode to facilitate said V.18 connection.

42. The second gateway device of claim 39, wherein said controller is configured to modify a CM signal to generate an erroneous CM signal, and cause said transmitter to transmit said erroneous CM signal to said remote modem while monitoring.

43. A second gateway device for establishing a modem relay, said second gateway device comprising:

a receiver configured to receive a request from a first gateway device for establishing a communication between a local modem and a remote modem;

a controller configured to place a call to said remote modem for establishing said communication, and detect an amplitude modulated answer tone (ANSam) signal from said remote modem for a predetermined period of time;

a transmitter configured to transmit an ANSam message to said first gateway device in response to detecting said ANSam;

wherein said controller is further configured to monitor for receipt of a call menu (CM) message from said first gateway device during a predetermined period of time, modify a CM signal to generate an erroneous CM signal, and cause said transmitter to transmit said erroneous CM signal to said remote modem during said predetermined period of time.

44. The second gateway device of claim 43, wherein said controller is further configured to monitor for receipt of an AA message from said first gateway device, monitor for detection of a modulation type signal from said remote modem, and monitor for receipt of a pass through mode message from said first gateway device.

45. The second gateway device of claim 43, wherein said controller is further configured to monitor for detection of an energy from said remote modem, wherein said energy is not related to said modulation type signal, and wherein said controller is further configured to detect said energy, cause said transmitter to transmit a modem pass through message to said first gateway device, and configure said second gateway device to modem pass through mode.

* * * * *